(12) United States Patent
Stålhammar (10) Patent No.: US 7,938,472 B2
(45) Date of Patent: May 10, 2011

(54) DOOR MODULE AND A METHOD FOR CONNECTING AN OPERATING DEVICE FOR A CLOSING AND OPENING MECHANISM IN A VEHICLE DOOR AND A HANDLE

(75) Inventor: Carl Stålhammar, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 844 days.

(21) Appl. No.: 11/571,517

(22) PCT Filed: Jun. 29, 2005

(86) PCT No.: PCT/SE2005/001046
§ 371 (c)(1),
(2), (4) Date: Nov. 16, 2007

(87) PCT Pub. No.: WO2006/004516
PCT Pub. Date: Jan. 12, 2006

(65) Prior Publication Data
US 2008/0258494 A1    Oct. 23, 2008

(30) Foreign Application Priority Data

Jun. 30, 2004 (SE) .................................. 0401714

(51) Int. Cl.
*B60J 5/04* (2006.01)
(52) U.S. Cl. ................ 296/146.5; 296/146.7
(58) Field of Classification Search .............. 296/146.1, 296/146.7, 146.9, 146.4, 146.5, 146.6; 49/502
See application file for complete search history.

(56) References Cited

U.S. PATENT DOCUMENTS

| | | | |
|---|---|---|---|
| 3,094,352 A | | 6/1963 | May |
| 5,095,659 A | | 3/1992 | Benoit et al. |
| 5,117,665 A | | 6/1992 | Swan et al. |
| 5,425,206 A | * | 6/1995 | Compeau et al. ............... 49/502 |
| 5,535,553 A | * | 7/1996 | Staser et al. .................... 49/502 |

(Continued)

FOREIGN PATENT DOCUMENTS

EP    0336746 A2    10/1989

(Continued)

OTHER PUBLICATIONS

International Search Report from corresponding International Application PCT/SE2005/001046.

(Continued)

*Primary Examiner* — Glenn Dayoan
*Assistant Examiner* — Gregory Blankenship
(74) *Attorney, Agent, or Firm* — WRB-IP LLP (57) ABSTRACT

A door module for forming a vehicle door, the door module including a frame and, arranged on the frame, a mechanism for closing and opening a vehicle door formed by the door module. The closing and opening mechanism exhibits an operating device that is so arranged as to be capable of displacement between two positions for the adjustment of the closed and open condition respectively. The operating device is provided with the first of two interacting snap-in connection parts, both of which snap-in connection parts together form a snap-in connection for the automatic, connection of the operating device and a handle provided with the second snap-in connection part that is intended respectively for closing and opening a vehicle door formed by the door module.

20 Claims, 11 Drawing Sheets

U.S. PATENT DOCUMENTS

| | | | |
|---|---|---|---|
| 5,715,630 A * | 2/1998 | Szerdahelyi et al. | 49/351 |
| 5,855,096 A * | 1/1999 | Staser et al. | 49/503 |
| 5,904,002 A * | 5/1999 | Emerling et al. | 49/502 |
| 6,205,714 B1 * | 3/2001 | Staser et al. | 49/502 |
| 6,619,709 B1 | 9/2003 | Monig et al. | |
| 6,748,775 B1 | 6/2004 | Bucker et al. | |
| 6,908,140 B1 * | 6/2005 | Carter et al. | 296/146.1 |
| 7,228,610 B2 * | 6/2007 | Carter et al. | 29/428 |
| 7,441,374 B2 * | 10/2008 | Syed et al. | 49/502 |
| 2002/0178770 A1 | 12/2002 | Monig | |
| 2008/0258494 A1 * | 10/2008 | Stalhammar | 296/146.1 |

FOREIGN PATENT DOCUMENTS

EP        0646688 A1      4/1995

OTHER PUBLICATIONS

International Preliminary Report on Patentability from corresponding International Application PCT/SE2005/001046.

* cited by examiner

DOOR MODULE AND A METHOD FOR CONNECTING AN OPERATING DEVICE FOR A CLOSING AND OPENING MECHANISM IN A VEHICLE DOOR AND A HANDLE

BACKGROUND AND SUMMARY

The present invention relates to a door module intended to constitute a vehicle door.

In conjunction with the production and assembly of vehicle doors intended for goods vehicles, for example, an effort is made to employ simple and rational methods which can make production more efficient and reduce the necessary assembly time in the factory. In accordance with the prior art, production of vehicle doors takes the form of the step-by-step assembly on a door frame of individual components such as opening rods, locking rods, handles, window regulators and associated motors, reinforcement beams, loudspeakers, etc.

The traditional method of assembly is time-consuming, however, and also requires all the individual components to be capable of assembly and functional testing by the final manufacturer of the door. One possible approach to rationalizing production would involve producing the vehicle door in modules, which are then assembled together to produce a finished door. A module of this kind may include one or preferably a plurality of components for providing the functions that the vehicle door is required to exhibit. A vehicle door must, however, exhibit a seal which separates a wet side and a dry side of the door, and in conjunction with the use of a module, this seal thus requires to be arranged between an outer door part and a module of this kind which contains the components of the door in order to ensure that the components of the module that are situated on the side of the module that constitutes the inside of the door are not exposed to moisture. Due to the presence of this seal between the wet side and the dry side, and a panel extending around the periphery of the door which constitutes the end wall of the door, there is no access to the space that might otherwise-exist between the module and the outer part of the door after the module has finally been installed on the outer door part. There is thus no possibility, once assembly of the module on the outer door part is complete, of arranging or assembling some other component between the outer door part and the module. This means that the attachment, if required, of an individual component on the outer door part, such as an external handle, and of an individual component on the module, such as an opening rod, must take place before the outer door part and the module in its entirety are connected together so that the necessary sealing is obtained between the wet side and the dry side of the door.

As a consequence of the fact that the door must also be made theft-proof, an external handle on the door must extend through an aperture in the door and must be connected to an opening rod on the inside of the outer part of the door. The opening rod is included in an opening and closing mechanism for opening and closing the vehicle door. Connecting together the opening road and the external handle is a relatively complicated and time-consuming assembly stage. Such assembly calls for a number of manual operations on the part of an assembly worker, and the assembly procedure is more complicated if the opening and closing mechanism is arranged on a module which must then be connected together with an outer part of the door because, on the one hand, access to the space between the module and the outer part of the door is severely restricted when the outer part of the door and the module are positioned close to one another, and, on the other hand, the module must be placed within a specific maximum distance from the outer part of the door if there is to be any possibility at all of connecting the external handle and the opening rod to one another.

It is desirable to make available a door module of the kind defined by way of introduction, which door module can reduce substantially at least one or other of the discussed disadvantages of previously disclosed vehicle doors, so that the assembly of a vehicle door and its components can be performed in a time-saving fashion and/or with the need for fewer manual operations by an assembly worker.

A distinctive feature, namely that the operating device is provided with the first of two interacting snap-in connection parts, both of which snap-in connection parts together constitute a snap-in connection for the automatic connection of the operating device and a handle provided with the second snap-in connection part that is intended respectively for closing and opening a vehicle door constituted by means of the door module, means that the necessary connection of the opening and closing mechanism in the door module together with a handle in a vehicle door can be accomplished without the need for an assembly worker manually to connect together an opening rod and a handle. An outer door part provided with a handle can instead be attached to the door module for the purpose of constituting the vehicle door, and the necessary sealing between the wet side and the dry side of the door can be achieved, after which the opening and closing mechanism in the module can be connected automatically to the handle. By means of the automatic snap-in connection, the opening and closing mechanism and the handle can be connected together, after having been positioned appropriately in relation to one another, simply by causing them to move towards one another until they are a specific mutual distance apart. This in turn opens the way for the effective use of a pre-assembled multi-component module, which can be subjected to functional testing in respect of all the components, both individually and together, before the door module can be finally assembled in a simple fashion in a vehicle door.

The invention also relates to a vehicle door and a method for connecting together an operating device for a closing and opening mechanism and a handle in a vehicle door.

BRIEF DESCRIPTION OF THE DRAWINGS

Preferred illustrative embodiments of the invention given here by way of example are described below in greater detail with reference to the accompanying drawings.

In the drawings.

DETAILED DESCRIPTION

Figure 1:
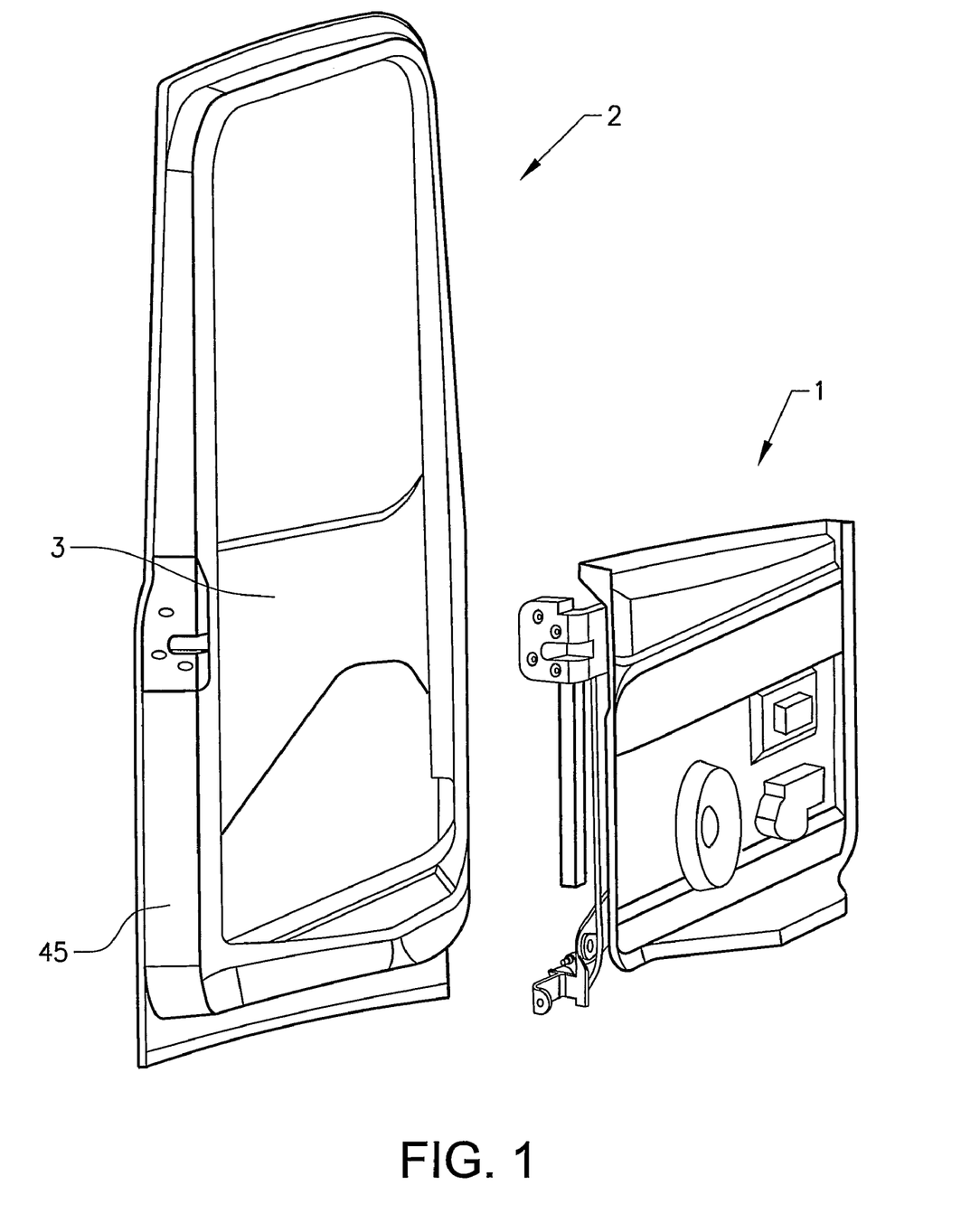
FIG. 1 is a perspective view of a door module and a door frame in accordance with the invention.
Figure 2A:
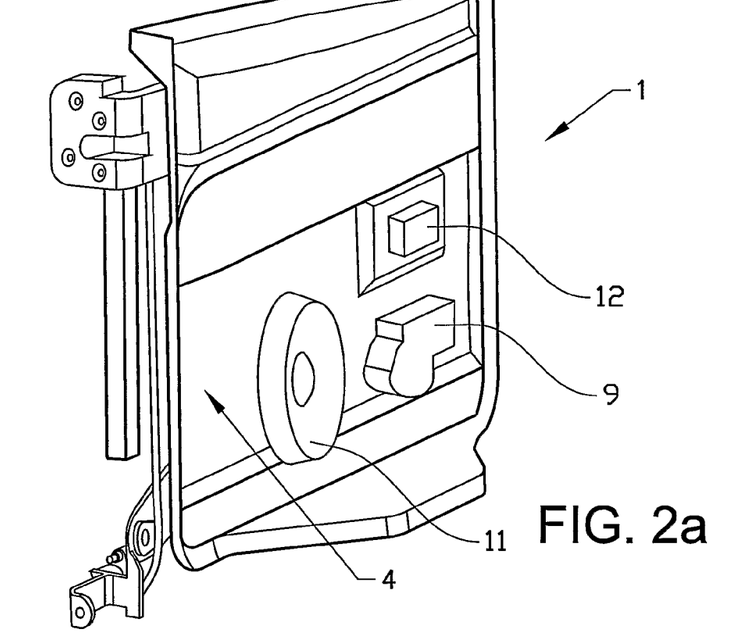
FIG. 2a is a perspective view of a door module in accordance with the invention showing the inside of the door module.
Figure 2B:
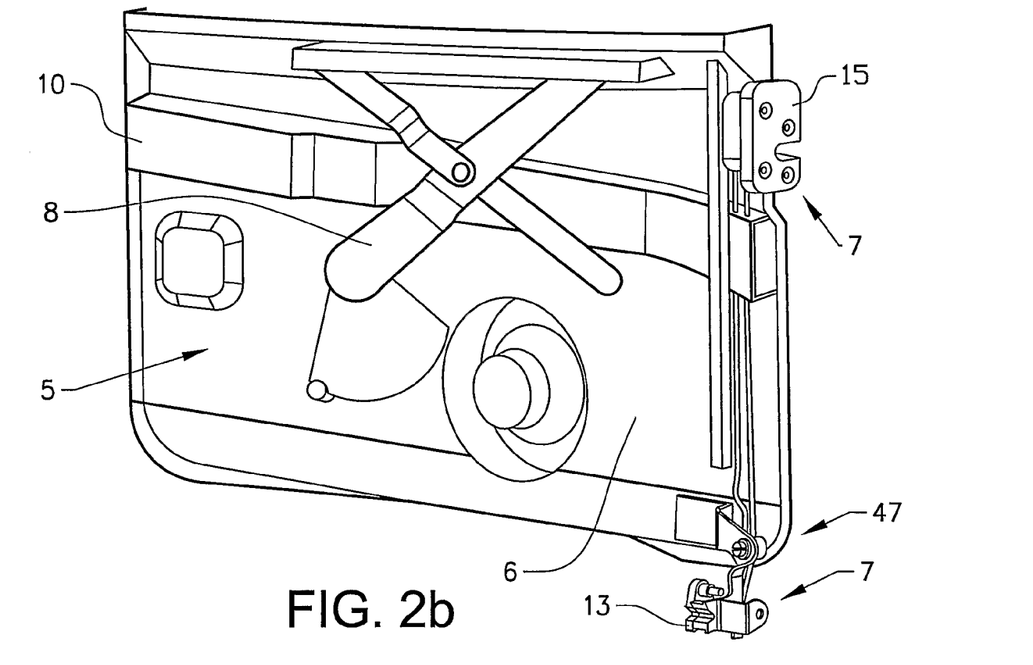
FIG. 2b is a perspective view of a door module in accordance with the invention showing the outside of the door module.

FIG. 1 shows as a perspective view a door module 1 in accordance with the invention and a door frame 2 provided with an outer door part 3. The door module 1 can be attached to a second module, such as the aforementioned door frame 2, for the purpose of constituting a vehicle door. Illustrated in perspective in FIGS. 2a and 2b are the inside 4 and the outside 5 respectively of the door module 1. The inside of the door module 1 is intended to constitute the inside of a vehicle door, and the outside of the door module is intended to be arranged against the inside of the door frame 2. The door module 1 comprises a frame 6, such as a framework or a base plate or the like, and arranged on the frame 6 a mechanism 7 for closing and opening a vehicle door which comprises the door module 1. The door module can, if required, also comprise a number of different components, such as a window regulator 8 and an associated motor 9, a reinforcement beam 10 or other impact protection, a loudspeaker 11 and/or a control unit (ECU) 12 for the functional testing of the various components that are arranged in the door module 1.

Figure 3A:
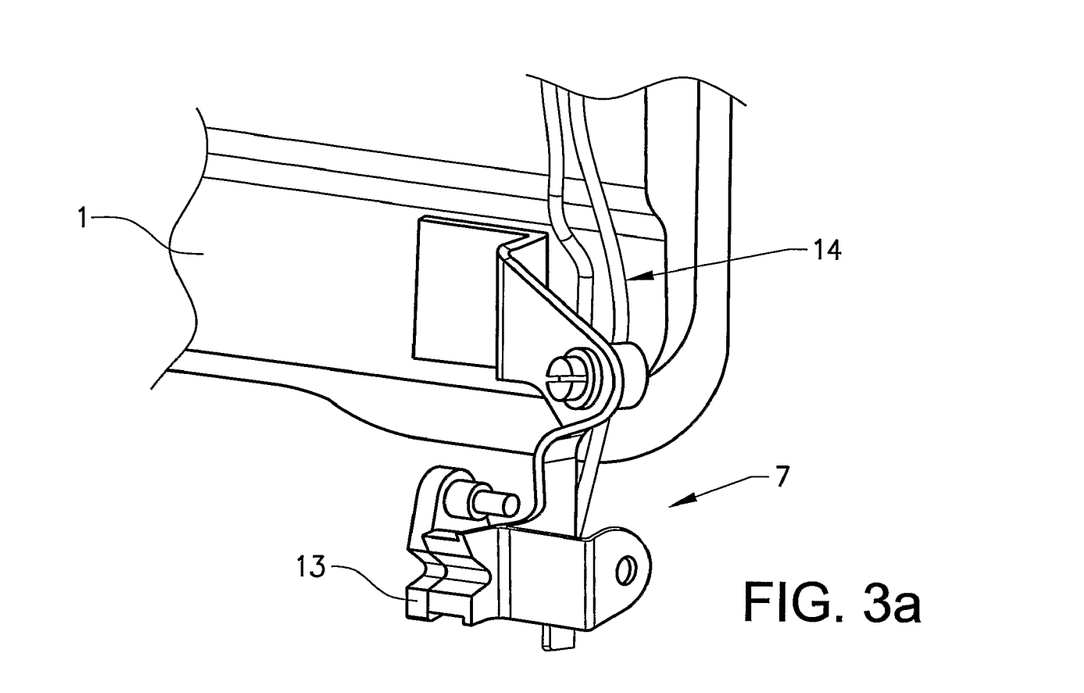
FIG. 3a is an enlarged partial view of FIG. 2b in perspective showing an operating device provided with a snap-in connection.
Figure 3B:
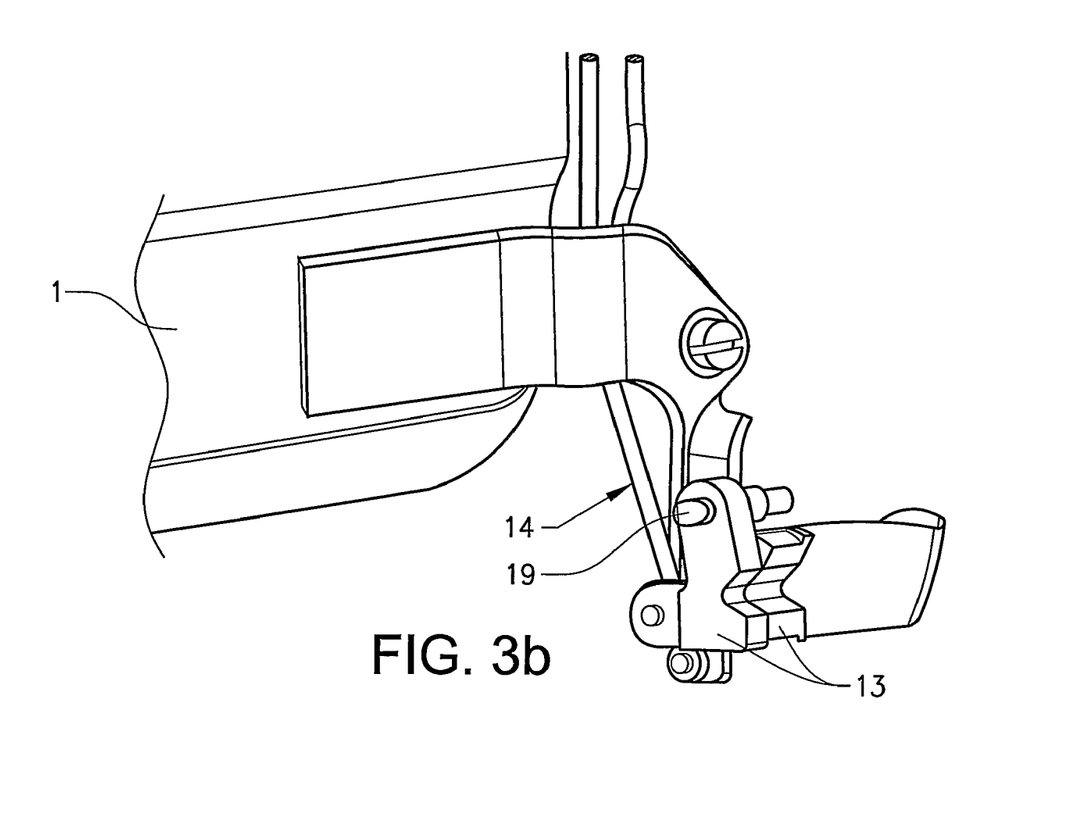
FIG. 3b is a perspective view showing the operating device in FIG. 3a from a different angle.
Figure 4:
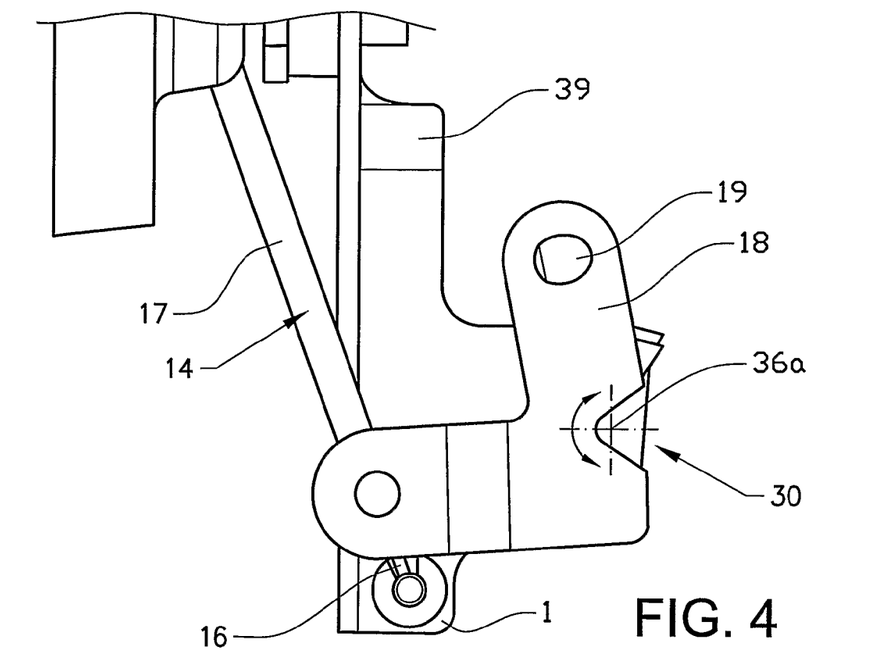
FIG. 4 is a plan view illustrating the operating device and an opening rod attached to the operating device.
Figure 5:
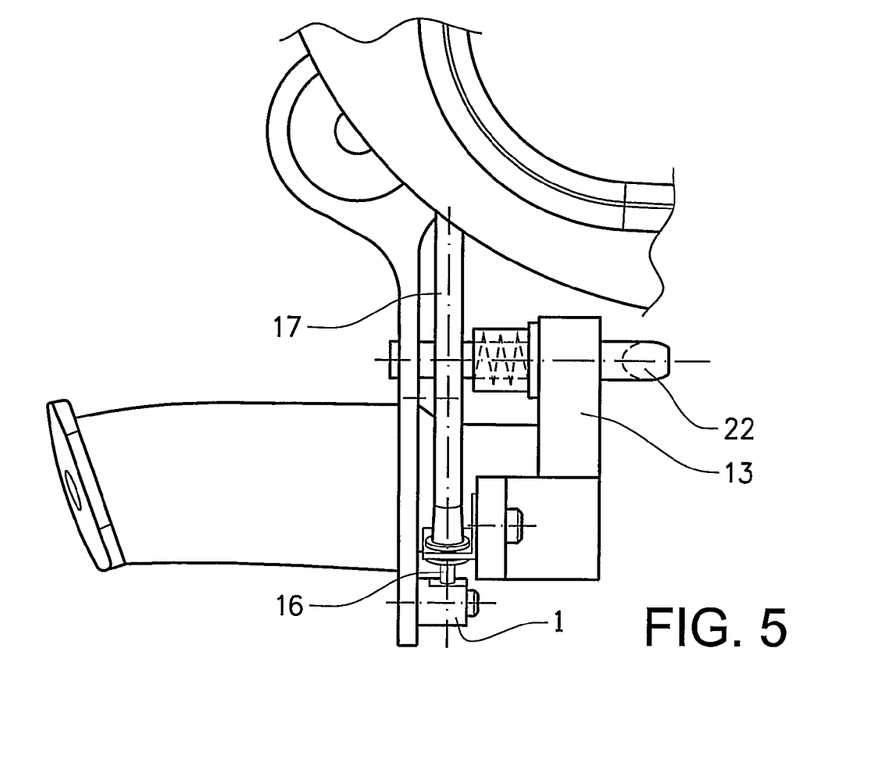
FIG. 5 is a side view of the operating device in FIG. 4.

As can be appreciated more clearly from the enlarged perspective views in FIGS. 3a and 3b, the closing and opening mechanism 7 exhibits an operating device 13 that is so arranged as to be capable of displacement between two positions for the adjustment of the closed and open status respectively in a vehicle door. In the illustrated example, the operating device 13 is attached to an opening rod 14 or wire that extends between the operating device 13 and a locking device 15 (FIG. 2b). As can be appreciated from the plan views in FIGS. 4 and 5, and from the perspective view in FIG. 6, the opening rod 14 comprises an inner wire part 16 and an enclosing sheath 17. The sheath 17 is so arranged as to be capable of displacement in relation to the wire part 16. The operating device 13 and the sheath 17 are attached to one another in such a way that, in conjunction with the displacement of the operating device 13, the sheath 17 and thus a part of the locking device 15, such as a lock cylinder, is actuated in the vehicle door. The wire part 16 in the opening rod 14 is also secured to and pivotally arranged in relation to the door module 1 in such a way as to enable it to accompany the movement of the operating device 13 when it is displaced between the aforementioned two positions. Although the operating device 13, as illustrated in FIG. 4, is preferably pivotally arranged about a pivot center 36a between the aforementioned two positions, and is appropriately executed as a link arm 18, it must be pointed out that, in another embodiment, the operating device could be executed in a different manner and arranged instead so as to provide linear displacement between the aforementioned two positions.

Figure 6:
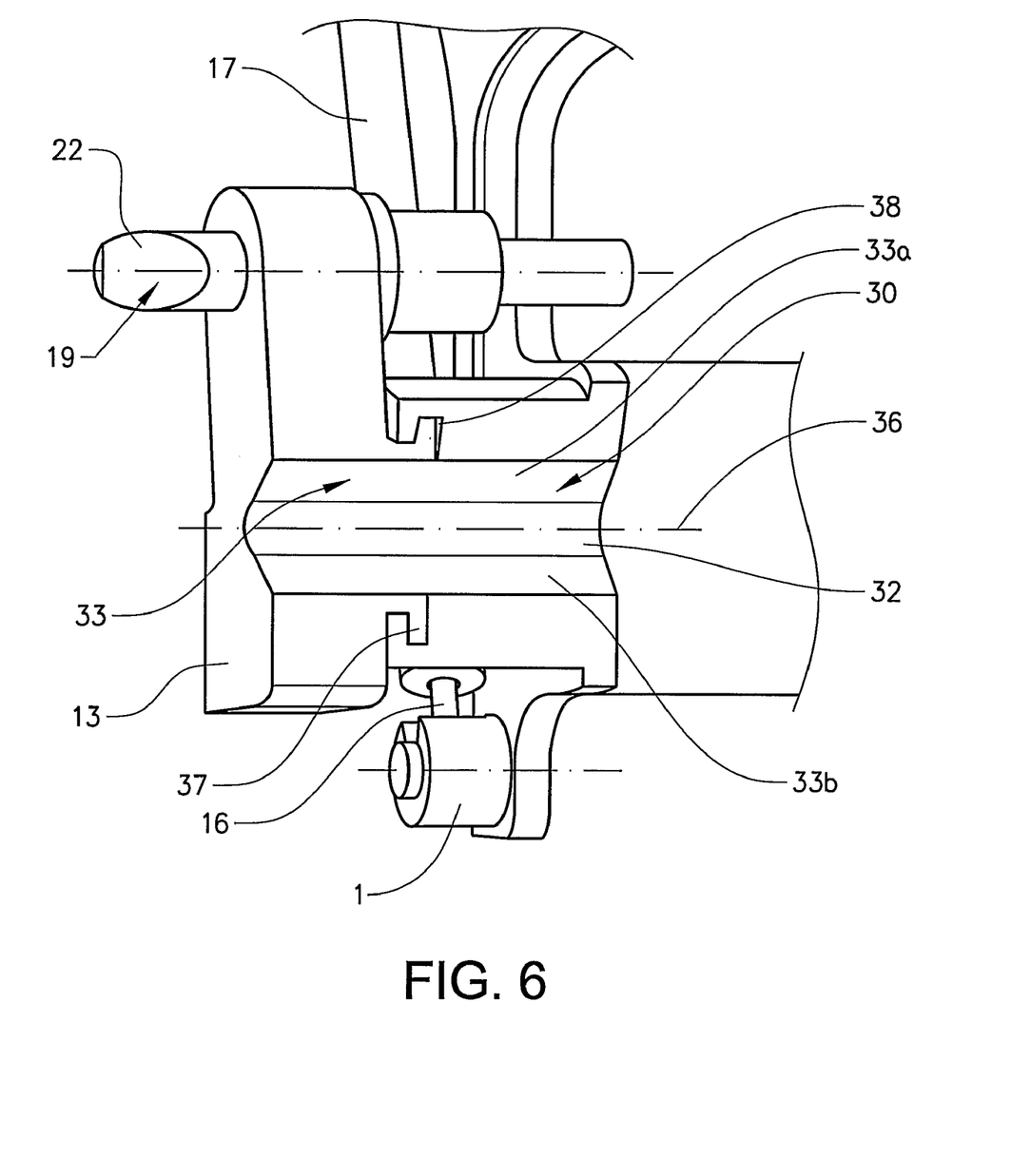
FIG. 6 is a perspective view of the operating device provided with a first snap-in connection part in the form of a pin.

Illustrated in FIG. 6 is the operating device 13, which in accordance with the invention is provided with a first 19 of two interacting snap-in coupling parts 19, 20 (see also FIGS. 7b, 7c and 7d), both of which snap-in connecting parts together constitute a snap-in connection for the automatic connection of the operating device 13 and a handle 21 provided with the second snap-in connection part 20. The first snap-in connecting part 19 is illustrated in FIG. 6, and the operating device 13 provided with the first snap-in connecting part 19 together with a handle 21 exhibiting the second snap-in connecting piece 20 are illustrated in perspective in FIGS. 7a, 7b, 7c and 7d. The handle 21 is an external handle arranged respectively for closing and opening a vehicle door constituted by means of the door module 1.

The expression automatic snap-in connection is used in this description and the following Patent Claims to denote a coupling of the kind in which two parts 19, 20 can be connected together to provide a power-transmitting coupling without the need for manual handling of any of the snap-in connection parts in order to achieve connection by means of one or two operations. This means that an assembly worker is not required to hold, or to apply any manual force directly to either of the two snap-in connection parts 19, 20. Connection takes place automatically instead when the snap-in connection parts are positioned and moved towards one another until they are a predetermined mutual distance apart. The coupling is thus self-locking, and no additional manipulation is required after connection in order to secure the coupling. Connection can nevertheless be performed manually, in the sense that an assembly worker causes the two snap-in connection parts to move together by moving together two other components, such as the door module 1 and the handle 21, each of which exhibits one of the two snap-in connection parts 19, 20, so that the snap-in connection parts engage with one another.

Figure 7A:
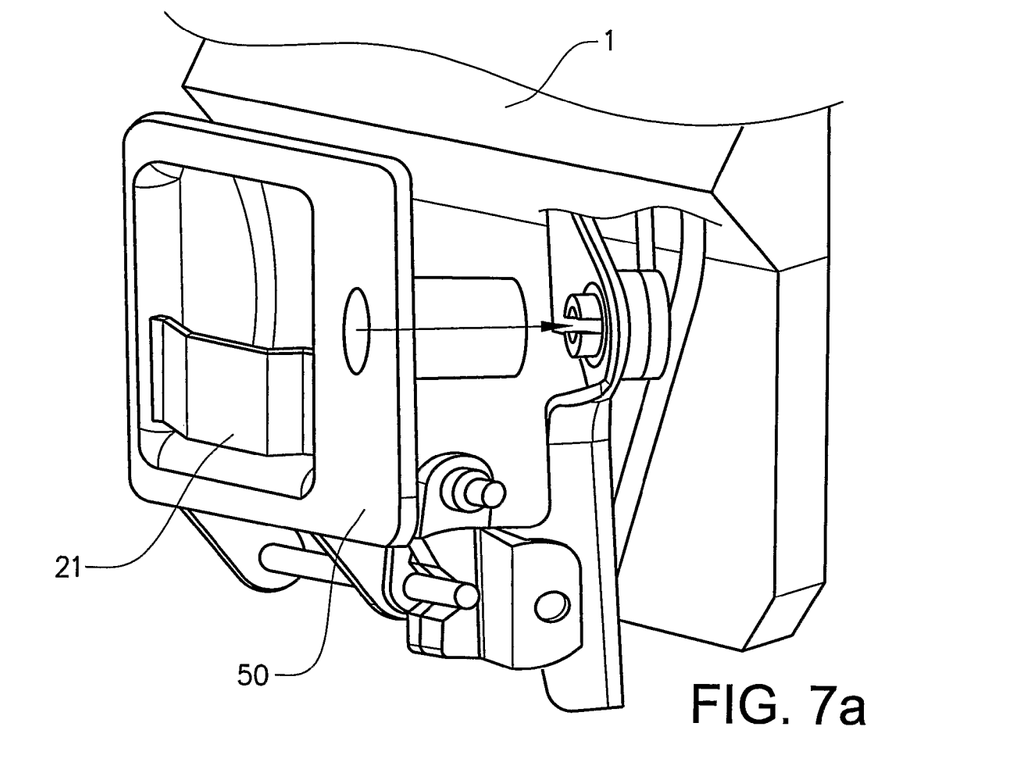
FIG. 7a is a perspective view illustrating the outside of a handle together with the door module.
Figure 7B:
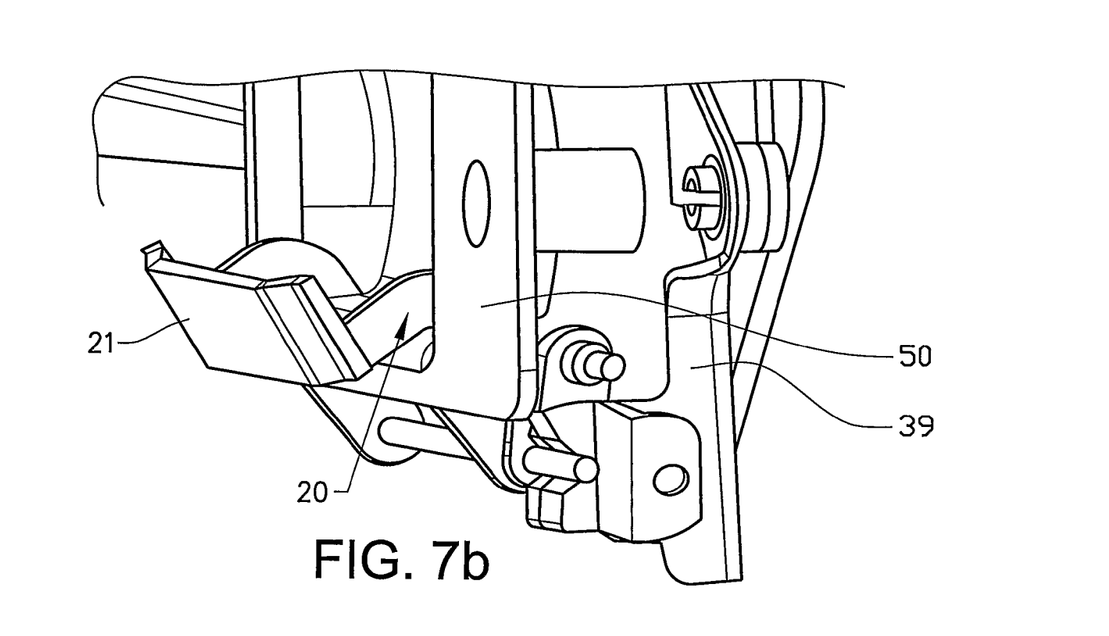
FIG. 7b is a perspective view corresponding to that in FIG. 7a showing the handle in an extended position.
Figure 7C:
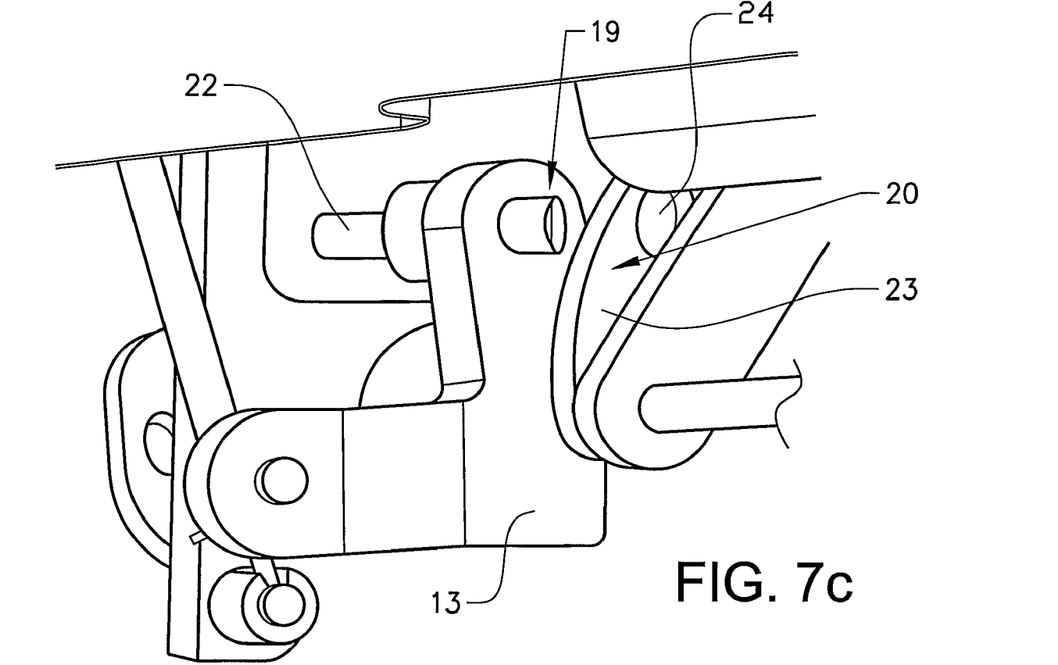
FIG. 7c is a perspective view showing the operating device provided with the first snap-in connection part and the handle with a second snap-in connection part, in conjunction with which the snap-in connection parts are not connected together.
Figure 7D:
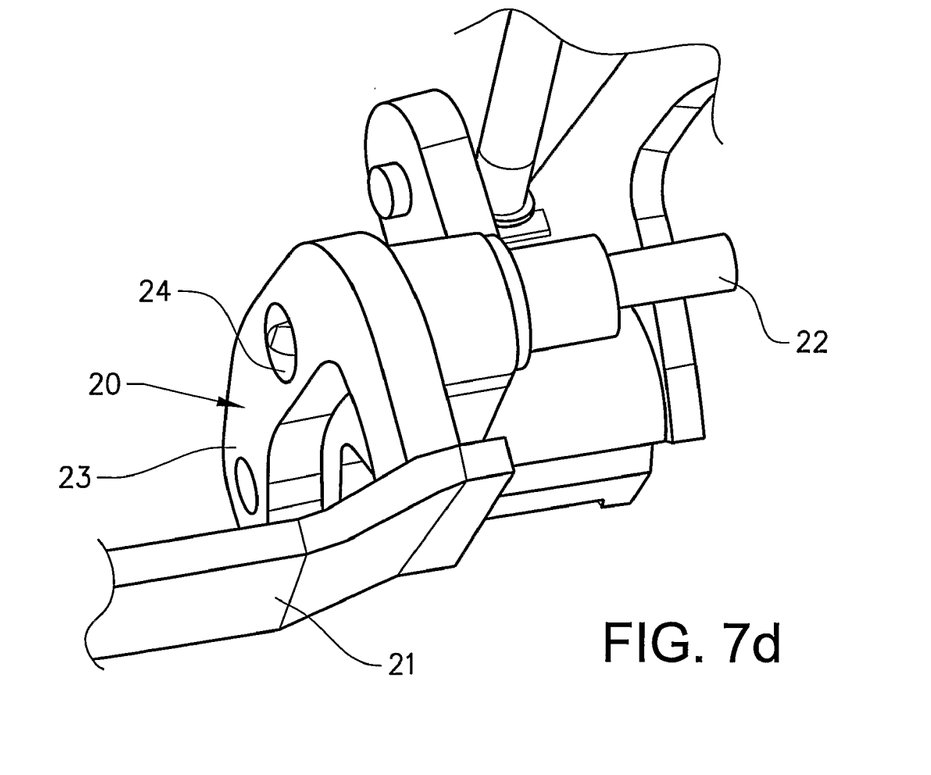
FIG. 7d is a perspective view showing the snap-in connection parts in FIG. 7c from a different angle, in conjunction with which the snap-in connection parts are connected together.

In one embodiment of the invention, the first snap-in connection part 19 comprises a device 22 that is so arranged as to be capable of displacement in relation to the operating device 13 and is intended to engage with the second snap-in connecting part 20; see FIG. 6 and FIGS. 7b and 7c. The movable device is preferably a pin 22, which is so arranged as to be capable of displacement in its longitudinal direction in relation to the operating device 13. The pin 22, which is preferably supported in such a way as to be free to slide in the operating device 13, is thus so arranged as to engage with the second snap-in connecting part 20 in the handle 21. The second snap-in connecting part 20 can be an arm 23 exhibiting a recess or an opening 24 in order to accommodate the pin 22 in the recess/opening 24; see in particular FIGS. 7c and 7d. With the help of the snap-in connection, a movement of the handle 21 can be transferred via the snap-in connection to the operating device 13 and onwards to other parts of the opening and closing mechanism 7.

Figure 8A:
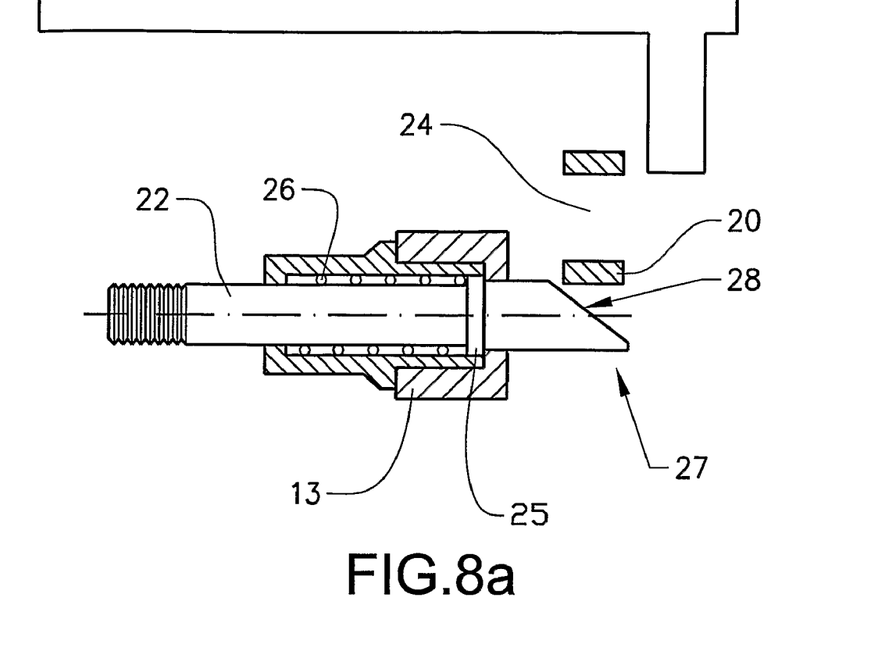
FIG. 8a is a cut-away view of the two snap-in connection parts, in conjunction with which the snap-in connection parts are not connected together.
Figure 8B:
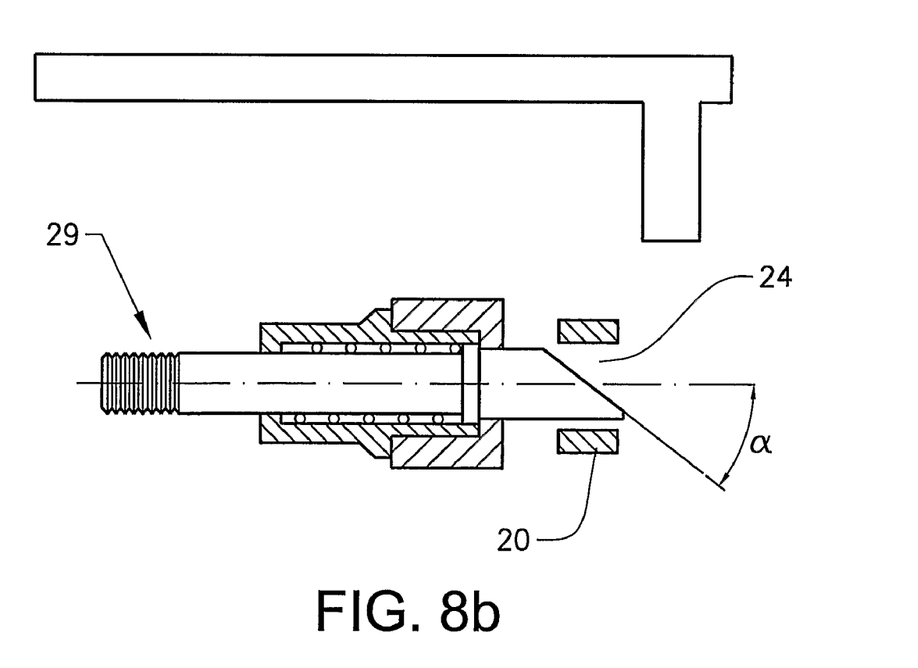
FIG. 8b is a cut-away view of the two snap-in connection parts, in conjunction with which the snap-in connection parts are connected together.

A pin 22 of this kind is illustrated in FIGS. 8a and 8b as partially cut-away views. The pin 22 appropriately exhibits a stop heel 25 or similar, which determines the distance for which the pin can be displaced relative to the operating device in one or both directions parallel with the extent of the pin in the longitudinal direction. The pin 22 can also be provided with a spring 26 so arranged as to prevent displacement of the pin 22 in a direction along the longitudinal direction of the pin, so that a particular resistance is created in conjunction with connection and/or in order to ensure that the pin 22 remains in the intended position in the opening 24 in the handle 21, which means that the snap-in connection is locked. In accordance with one embodiment of the invention, the pin 22 is provided, preferably at a first end 27, with a surface 28 inclined at an angle in relation to its longitudinal direction, in order, in conjunction with the application of a force to the aforementioned surface in a direction that is essentially perpendicular to the longitudinal direction of the pin, to create a force component that brings about a sliding movement in the pin 22 in its longitudinal direction. The inclined surface can form an angle a with the longitudinal direction of the pin in the range $0<a<90°$, and preferably in the range 20-70°, and the angle a is advantageously approximately 45°. By means of such an inclined surface 28, the pin 22 can be brought into engagement in conjunction with displacement of the pin in a direction towards the second snap-in connection part 20, that is to say in a direction upwards in FIG. 8a. The pin is then locked to prevent displacement in the opposite direction, that is to say in a direction downwards from the position illustrated in FIG. 8b, by coming into contact with the second snap-in connection part 20. In order to facilitate dismantling of the snap-in connection part, the pin 22 may be provided with an external thread, for example, at its other end 29. It is possible, by means of a tool with a corresponding internal thread, for the tool to be attached to the pin 22 in such a case, and for the pin then to be displaced in its longitudinal direction so that it is brought out of engagement with the arm 23 on the second snap-in connection part 20.

It should be emphasized at this point that, although it has been stated that the first snap-in connection part 19 arranged in the operating device 13 exhibits a device 22 that is so arranged as to be capable of displacement, such as the aforementioned sliding pin, the situation could also be the opposite, that is to say the second snap-in connection part in the handle could exhibit a device so arranged as to be capable of displacement in relation to the handle, and the first snap-in connection part in the operating device could in such a case include a component exhibiting a recess or an opening for the purpose of accommodating the movable device in the second snap-in connection part.

Figure 9A:
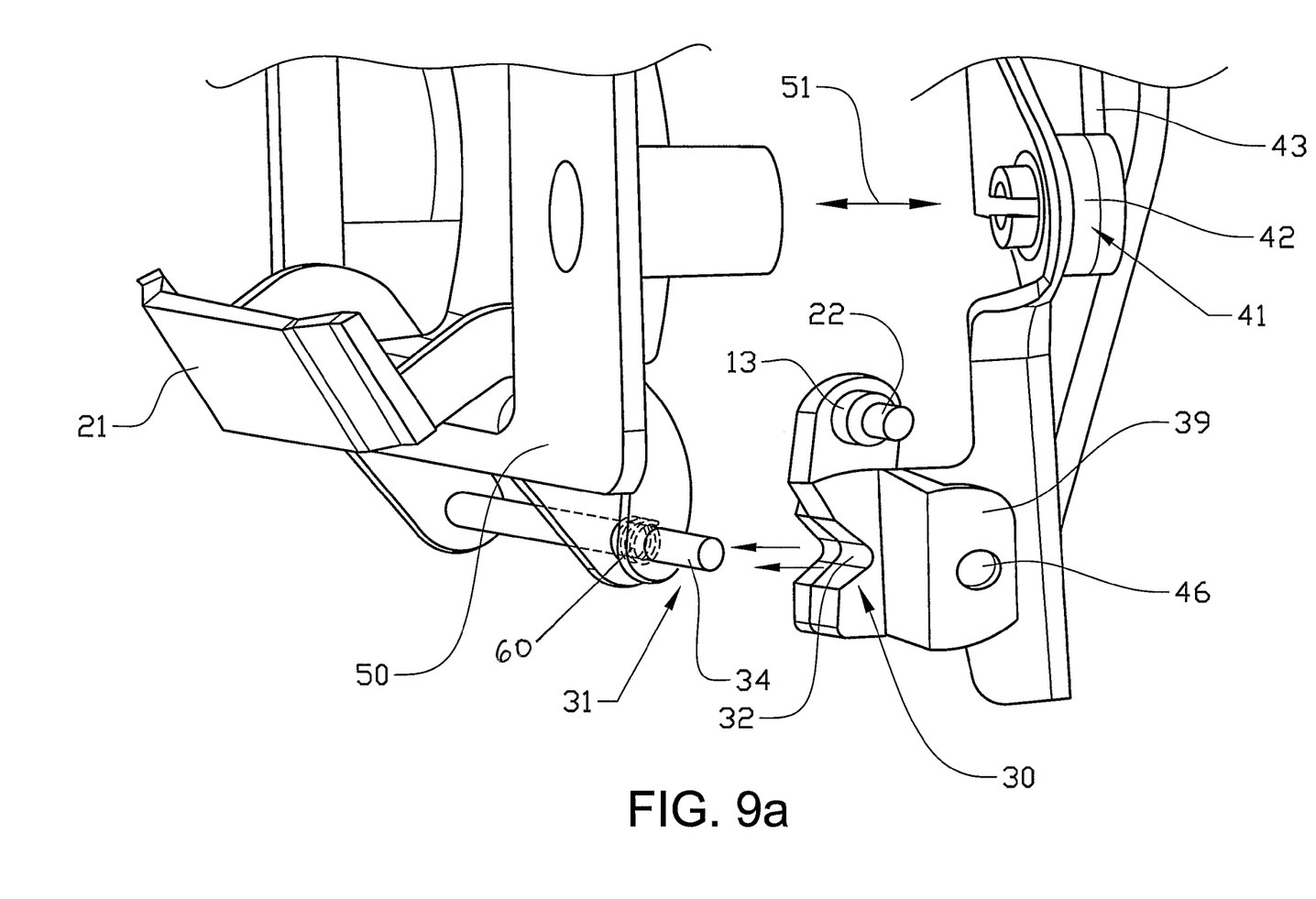
FIG. 9a is a perspective view illustrating a first and a second positioning means.
Figure 9B:
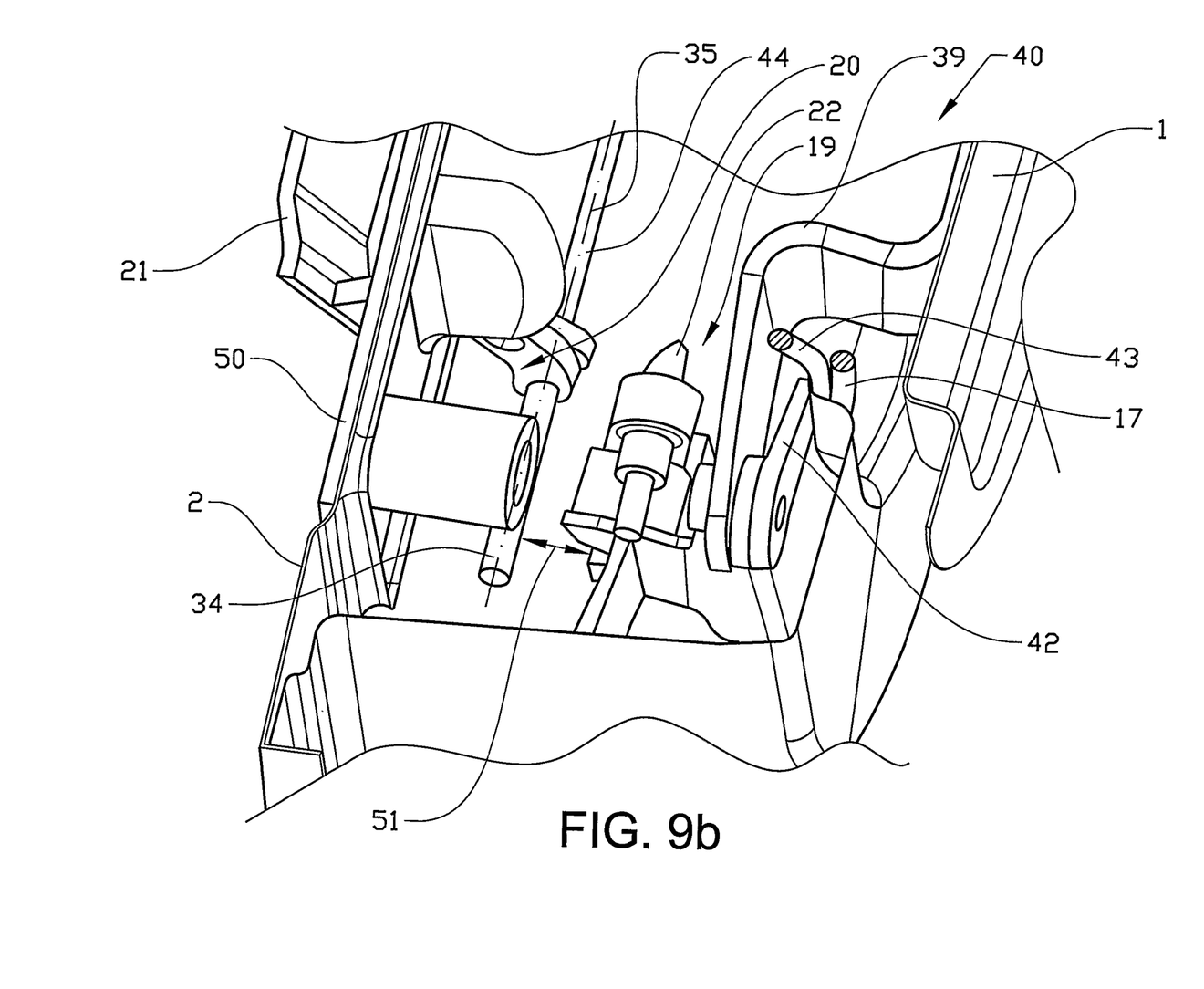
FIG. 9b is a perspective view showing the first and a second positioning means in FIG. 9a from a different angle.

As illustrated in FIGS. 9a and 9b, the movable device, such as an aforementioned sliding pin 22, can be so arranged as to be capable of displacement in a direction that is essentially perpendicular in relation to the intended direction of connection for the snap-in connection and/or in relation to the intended direction of connection 51 for the door module 1 and a second door module 2 in conjunction with assembly of the door modules to produce a vehicle door. In conjunction with connecting the door module 1 and the aforementioned handle 21 in the second door module 2, and in order to facilitate connection of the snap-in connection parts 19, 20, the door module 1 can exhibit a first means 30 for positioning the door module 1 in relation to the handle 21 and/or in relation to the aforementioned second door module 2 by interaction with a second means 31, which second positioning means 31 is arranged in an insert unit 50 arranged in relation to the handle 21 or in some other position on the second door module 2. See also FIG. 6.

In a preferred embodiment of the invention, the first positioning means 30 exhibits a recess 32 arranged in the door module 1 exhibiting at least one guide surface 33 for positioning and accommodating a shaft 34 in the second door module 2; see FIGS. 6 and 9b. In this case the extent of the shaft 34 in the longitudinal direction can coincide with a geometrical axis of rotation 35 for the aforementioned handle 21 arranged in the second door module 2. In order to provide additional assurance that that the handle 21 and the operating device 13 are positioned in relation to one another before and during connection of the snap-in connection parts 19, 20, a part of the aforementioned recess 32 can be arranged in the operating device 13. In an embodiment of this kind, the operating device 13, such as a link arm, is so arranged as to be capable of pivoting between the aforementioned two positions, and the operating device 13 appropriately exhibits a geometrical axis of rotation 36 arranged in relation to the aforementioned at least one guide surface 33, and preferably two guide surfaces 33a, 33b, so that the geometrical axis of rotation 36 essentially coincides with the geometrical axis of rotation 35 of the aforementioned handle 21 when positioning is performed before and during connection by means of the snap-in connection. In the example illustrated in FIG. 6, the operating device is a link arm 13 provided with a flange 37, which flange is arranged in a slot 38 in the door module 1 in order for the link arm 13 to be capable of pivoting in relation to the rest of the door module 1.

It is appropriate, as shown in FIGS. 9a and 9b, for example, for the frame 6 of the door module to comprise a part 39 projecting in relation to the principal plane in which the door module 1 extends, in which part the operating device 13 is arranged. The projecting part, such as a bracket 39 or similar, can thus be provided with the aforementioned slot 38 (illustrated in FIG. 6) for the purpose of accommodating the aforementioned flange 37 in the operating device 13 so that the operating device is pivotally arranged in the door module. The door module 1 is preferably executed essentially as a panel extending in two dimensions in one and the same plane that are substantially greater than the extent in the third dimension. This means that the aforementioned projecting part 39 extends in a direction parallel with the aforementioned third dimension of the door module 1. A space 40 can be created in this way between the door module 1 and the handle 21 and/or the second door module 2 to enable various door components to be accommodated in between. A means 41, see FIG. 9a, for locking the closing and opening mechanism 7 in the closed position can also be arranged on the projecting part 39. The locking means 41 can comprise a locking arm 42, which is connected at its one end to a locking rod 43 respectively for locking and unlocking the door lock in the vehicle door. The locking arm is appropriately designed to accommodate a key cylinder for this purpose.

The interaction between the first positioning means 30 and the second positioning means 31, such as the shaft 34 in the second door module 2, also possesses the characteristic that, after connection of the snap-in connection and subsequent actuation of the handle 21 for the displacement of the operating device 13, while forces are applied to the link arm 13 and the bracket 39, the shaft 34, which is preferably a prolongation of the pivot axis 44 of the handle 21, provides an abutment which supports the link arm 13 and the projecting part 39 so that flexure of these components is prevented. In order additionally to fix the position of the bracket 39, the bracket can be attached, after connection of the snap-in connection, to the second door module 2 in some other position by means of a screwed joint or its equivalent. The bracket 39 is preferably attached to a door end wall 45 (see also FIG. 1) in the second door module 2. In the design illustrated in FIG. 9a, the bracket 39 exhibits a screw hole 46 to permit the introduction of an attachment of this kind relative to the end wall 45 of the door.

In the example illustrated in FIG. 2b, the operating device 13 is arranged in the lower part 47 of the door module 1, and the operating device 13 is arranged in the lower part of the vehicle door after assembly. The invention also relates to a vehicle door comprising a door module 1 in accordance with the invention. The door module 1 is appropriately arranged as an inner part of the vehicle door, and the second door module 2 is arranged as an outer part of the vehicle door. In the case of vehicle doors for goods vehicles exhibiting a relatively high entry height, the handle 21, and accordingly also the operating device 13, are arranged in the lower part of the vehicle door, in addition to which a device in the opening and closing mechanism 7, such as a piston or the like, is connected to the operating device 13 for the purpose of closing and opening the vehicle door relative to a vehicle and is often arranged at a significantly higher level than the handle 21. For this purpose the handle 21 is so arranged as to pivot outwards and downwards in relation to the vehicle door in order to open the vehicle door. It must be emphasized that all the variants and designs of the door module described in this patent application can also be made available in a vehicle door in accordance with the invention, and that these variants and designs can be combined with the distinctive features that are described specifically for the vehicle door.

The invention also relates to a method for connecting together an operating device 13 in a closing and opening mechanism 7 and a handle 21 in a vehicle door, in conjunction with which, when in the connected state, the operating device 13 is capable of being displaced between two positions for opening and closing of the vehicle door by actuation of the handle 21. The operating-device 13 and the handle 21 are connected together automatically by means of a snap-in connection 19, 20. The closing and opening mechanism 7 is preferably arranged on a first door module 1, which is then connected to a second door module 2, such as an outer door part 2, in order to produce a vehicle door. Connection of the operating device 13 and the handle 21 can be effected in a manner of which there are at least two variants.

In one variant of the method in accordance with the invention, the handle 21 is arranged on the second door module 2, after which the door module 1 and the second door module 2 are brought together and, for example, are attached to one another by means of screws or the like. The operating device 13 and the handle 21 are then connected together by means of the snap-in connection 19, 20 by displacement of the handle 21. In another variant, the first door module 1 and the second door module 2 are connected together in a first stage, and the handle is then arranged in the second door module, after which the operating device 13 and the handle 21 are connected together by means of the snap-in connection 19, 20. In both variants, the handle 21 can be arranged as an external handle on a vehicle door.

Figure 10:
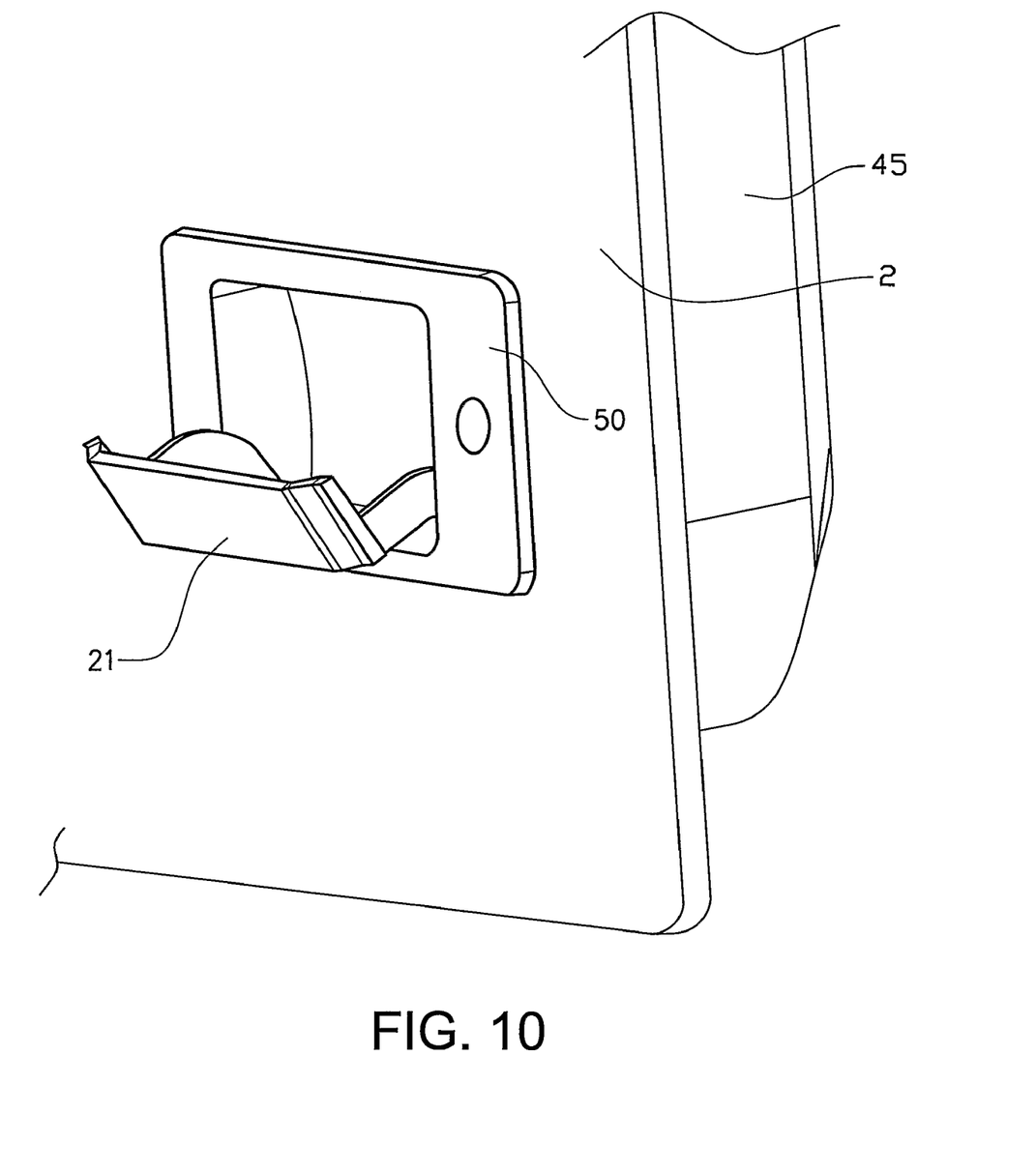
FIG. 10 shows a partial view in perspective of a vehicle door provided with an external handle and an associated insert unit.

The external handle 21 is usually pivotally mounted on an insert unit 50, which in turn is connected to the vehicle door 2 by means of spring clips or the like. See, for example, FIGS. 7a, 7b, 7c, 7d and 10. The fact that the handle 21 is pivotally mounted in relation to the insert unit 50 enables a reliable and durable construction to be achieved. Even before connection of the insert unit 50 to the vehicle door takes place, the handle 21 is pivotally mounted in the positions about which the handle will subsequently be caused to pivot when it is used. In the illustrated design, the handle is mounted in two positions for pivoting about the geometrical axis of rotation 35. There is accordingly no requirement for a mounting/storage position to be created when connecting together the snap-in connection. The outer door part 2 is omitted in FIG. 7a in the interests of clarity. In conjunction with assembly in accordance with the first variant, the insert unit 50 provided with the handle 21 is assembled on the outer door part 2 from the inside of the outer door part 2. The handle 21 is then placed in its extended open position (the handle 21 is illustrated in this position in FIG. 10) and is locked to prevent displacement, after which the door module 1 is brought together with the outer door part 2. The positioning means 30, 31 described above can be used for positioning the door module 1 and the second module 2 in relation to one another. Once the door module 1 has been positioned on the second module 2 in this way, it can be screwed securely to the latter, and the bracket 39 can also be screwed securely to the door end wall 45, if required, in order to provide additional fixing of the bracket. The locking of the handle 21 is then removed, and the handle is caused to pivot about its geometrical axis of rotation 35 either automatically by means of spring force, and/or manually, inwards towards the closed position (the handle 21 is illustrated in the flush, closed position in FIG. 7a). It is advantageous to use a spring 60 to cause the handle 21 to pivot and, by so doing, to bring the snap-in connection part 20 of the handle 21 into engagement with the snap-in connection part 19 of the operating device 13. Use should preferably be made of the spring 60 that is normally so arranged during use as to cause the handle to return to the closed position. A spring 60 of this kind is also arranged in order to ensure that the handle 21 satisfies certain safety criteria, which means that the handle must be able to withstand a certain load (acceleration) without opening of its own accord. The spring 60, which is illustrated in FIG. 9a, is secured at its one end to a fixed point, for example on the shaft 34 or on the bracket which supports the shaft 34, and is secured at its other end to the arm 23 on the handle 21. The handle 21 is caused to rotate towards the closed position while the arm 23 on the second snap-in connection part 20 reaches the pin 22 and, as its movement continues, pushes the pin 22 out of the way for a certain distance until the pin overlaps the opening 24 in the arm 23, and the pin 22 is returned by means of spring force 26 to its original position while it slides into the opening 24 in the arm 23. The snap-in connection is then connected together in the locked state and remains in this state unless special dismantling takes place. This means that the operating device 13 and the handle 21 have been connected together so that, in the event of a movement of the handle 21 outwards to the open position, the operating device 13 is caused to rotate about its axis of rotation 36. Rotation of the operating device 13 causes the operating device 13 in turn to influence the opening rod 14, and the opening rod 14 influences the locking device 15 so that the opening and closing mechanism 7 is set to the open position.

In conjunction with assembly in accordance with the second variant, the door module 1 is assembled on the second module 2 before the insert unit 50, which is provided with the handle 21, has been assembled on the outer door part 2. This means that the insert unit 50 will then be assembled from the outside of the outer door unit 2, preferably with the handle 21 locked in the extended open position. A means, such as the snap lock or similar, on the insert unit 50 is used in such a case in order to secure the insert unit 50 automatically to the outer door part 2 on the inside of the outer door part 2. In a corresponding fashion, the handle 21 can then be released to enable it to rotate towards the closed position, and connection of the snap-in connection parts 19, 20 to one another can take place.

The possibility exists, of course, for a person skilled in the art to modify the door module in accordance with the invention, the vehicle door, and the method in accordance with the invention within the scope of the idea of the invention, and it is emphasized that the invention is only restricted to the area of protection as defined by the following Patent Claims.

The invention claimed is:

1. A door module for forming a vehicle door, comprising
a frame
arranged on the frame a mechanism for closing and opening a vehicle door constituted by the door module, the closing and opening mechanism comprising an operating device that is so arranged as to be capable of displacement and is adapted to be displaced between two positions for adjustment of closed and open conditions of the vehicle door, respectively, wherein the operating device is provided with a first of two interacting snap-in connection parts, the two snap-in connection parts together forming a snap-in connection for automatic connection of the operating device and a handle, the handle being provided with the second snap-in connection part and being adapted to open and close the vehicle door,
wherein the first snap-in connection part comprises a device adapted to be displaced in relation to the operating device and adapted to engage with the second snap-in connection part.

2. The door module as claimed in claim 1, wherein the movable device is a pin that is adapted to be displaced in a longitudinal direction of the pin in relation to the operating device.

3. The door module as claimed in claim 2, wherein the first snap-in connection part comprises a spring arranged to reduce a distance of travel of the pin in a direction along the longitudinal direction of the pin when the pin is moved against the spring.

4. The door module as claimed in claim 2, wherein the pin is provided with a surface inclined at an angle in relation to its longitudinal direction, in order, in conjunction with an application of a force to the surface in a direction that is essentially perpendicular to the longitudinal direction of the pin, to create a force component that brings about a sliding movement in the pin in its longitudinal direction.

5. The door module as claimed in claim 2, wherein the pin is adapted to be displaced in a direction that is essentially perpendicular in relation to an intended direction of connection for the door module and a second door module in conjunction with production of the vehicle door.

6. The door module as claimed in claim 5, wherein the door module comprises a first means for positioning the door module in relation to the second door module in conjunction with connection of the door module and the handle on the second door module by means of the snap-in connection by interaction with a second means for positioning on the second door module.

7. The door module as claimed in claim 6, wherein the first positioning means comprises a recess arranged in the door module, the recess comprising at least one surface for guiding and accommodating the second positioning means, the second positioning means comprising a shaft in the second door module, an extent of the shaft in the longitudinal direction essentially coinciding with a geometrical axis of rotation for the handle arranged in the second door module.

8. The door module as claimed in claim 7, wherein a part of the recess is arranged in the operating device.

9. The door module as claimed in claim 7, wherein the operating device comprises a geometrical axis of rotation arranged in relation to the at least one guide surface, so that the geometrical axis of rotation essentially coincides with the geometrical axis of rotation of the aforementioned handle when positioning is performed before and during connection by means of the snap-in connection.

10. The door module as claimed in claim 1, wherein the frame comprises a part projecting in relation to a principal plane in which the door module extends, the operating device being arranged in the projecting part.

11. The door module as claimed in claim 10, wherein a means for locking the closing and opening mechanism in a closed position is arranged on the projecting part.

12. The door module as claimed in claim 1, wherein the operating device is a link arm.

13. The door module as claimed in claim 1, wherein the operating device is arranged in a lower part of the door module.

14. A vehicle door comprising a door module as claimed in claim 1.

15. A door module for forming a vehicle door, comprising
a frame
arranged on the frame a mechanism for closing and opening a vehicle door constituted by the door module, the closing and opening mechanism comprising an operating device that is so arranged as to be capable of displacement and is adapted to be displaced between two positions for adjustment of closed and open conditions of the vehicle door, respectively, wherein the operating device is provided with a first of two interacting snap-in connection parts, the two snap-in connection parts together forming a snap-in connection for automatic connection of the operating device and a handle, the handle being provided with the second snap-in connection part and being adapted to open and close the vehicle door, wherein the operating device is pivotally arranged between the two positions.

16. A vehicle door comprising
a first door module,
a mechanism for closing and opening the vehicle door, the mechanism is being arranged on a frame on the first door module, and
a second door module provided with a handle connected to the closing and opening mechanism,
wherein the closing and opening mechanism comprises an operating device adapted to be displaced by the handle between two positions for adjustment of closed and open conditions of the vehicle door by actuating a locking device of the closing and opening mechanism, the operating device being attached to an opening rod extending between the operating device and the locking device, wherein the operating device is provided with a first of two interacting snap-in connection parts, and the handle is provided with a second snap-in connection part of the two snap-in connection parts, wherein the first and the second snap-in connection parts together form a snap-in connection for automatic connection of the operating device and the handle.

17. The vehicle door as claimed in claim 16, wherein the first door module is arranged as an inner part of the vehicle door.

18. The vehicle door as claimed in claim 16, wherein the second door module is arranged as an outer part of the vehicle door.

19. The vehicle door as claimed in claim 16, wherein the handle is arranged in a lower part of the vehicle door, and a device attached to the operating device for closing and opening the vehicle door relative to a vehicle is arranged at a higher level than the handle.

20. The vehicle door as claimed in claim 16, wherein the handle is so arranged as to pivot outwards and downwards in relation to the vehicle door in order to open the vehicle door.

* * * * *